United States Patent
Shimizu

(10) Patent No.: US 9,509,559 B2
(45) Date of Patent: Nov. 29, 2016

(54) BANDWIDTH CONTROL APPARATUS, BANDWIDTH CONTROL METHOD, AND BANDWIDTH CONTROL PROGRAM

(71) Applicant: FUJITSU LIMITED, Kawasaki-shi, Kanagawa (JP)

(72) Inventor: Sho Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 568 days.

(21) Appl. No.: 13/949,786

(22) Filed: Jul. 24, 2013

(65) Prior Publication Data
US 2014/0032711 A1    Jan. 30, 2014

(30) Foreign Application Priority Data

Jul. 27, 2012  (JP) ................. 2012-166839

(51) Int. Cl.
| | |
|---|---|
| G06F 11/00 | (2006.01) |
| H04L 12/24 | (2006.01) |
| H04L 29/08 | (2006.01) |
| H04L 12/54 | (2013.01) |
| H04L 12/26 | (2006.01) |
| H04W 52/02 | (2009.01) |
| H04L 12/825 | (2013.01) |
| H04W 40/08 | (2009.01) |
| H04W 40/10 | (2009.01) |
| G06F 1/32 | (2006.01) |
| H04L 12/801 | (2013.01) |

(52) U.S. Cl.
CPC ......... *H04L 41/0803* (2013.01); *G06F 1/3209* (2013.01); *G06F 1/3278* (2013.01); *H04L 12/5602* (2013.01); *H04L 41/0833* (2013.01); *H04L 43/0894* (2013.01); *H04L 47/25* (2013.01); *H04L 67/10* (2013.01); *H04W 40/08* (2013.01); *H04W 40/10* (2013.01); *H04W 52/0225* (2013.01); *H04L 47/193* (2013.01); *Y02B 60/126* (2013.01)

(58) Field of Classification Search
USPC ...................... 370/252, 230.1, 232; 709/217
See application file for complete search history.

(56) References Cited

U.S. PATENT DOCUMENTS

| | | | | |
|---|---|---|---|---|
| 6,011,776 | A * | 1/2000 | Berthaud | H04L 12/5602 370/232 |
| 2011/0075583 | A1* | 3/2011 | Imai | H04L 41/0803 370/252 |
| 2011/0205919 | A1 | 8/2011 | Imai | |
| 2013/0176848 | A1* | 7/2013 | Jinzaki | H04L 47/193 370/230.1 |

FOREIGN PATENT DOCUMENTS

| | | |
|---|---|---|
| JP | 2008-219067 A | 9/2008 |
| JP | 2008-311830 A | 12/2008 |
| JP | 2011-199836 A | 10/2011 |

* cited by examiner

*Primary Examiner* — Kyung H Shin
(74) *Attorney, Agent, or Firm* — Arent Fox LLP

(57) ABSTRACT

There is provided a control apparatus that includes a reception unit configured to receive information including information of a transmission source, an amount of target data to be transmitted, and a destination, an identification unit configured to identify a transfer apparatus included in a route from the transmission source to the destination, a calculation unit configured to calculate a power consumption based on a transfer rate at which the transfer apparatus performs a transfer, power consumed by the transfer apparatus, and the amount of target data, a determination unit configured to determine a transfer rate corresponding to the power consumption calculated by the calculation unit, and a transmission unit configured to transmit a transfer request for requesting a transfer of the target data at the determined transfer rate to the transfer apparatus.

10 Claims, 15 Drawing Sheets

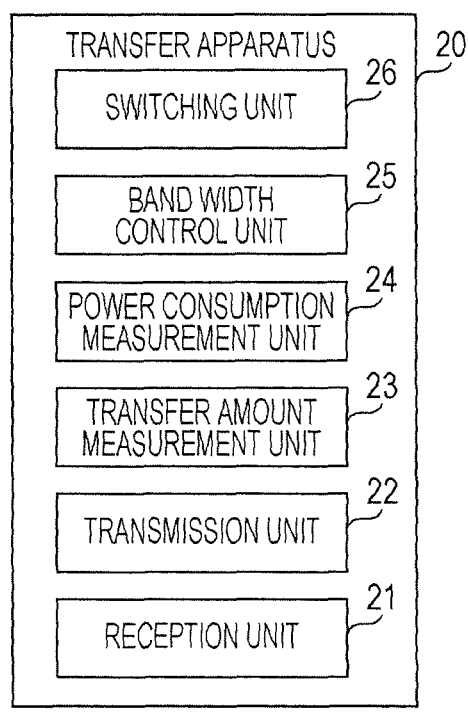
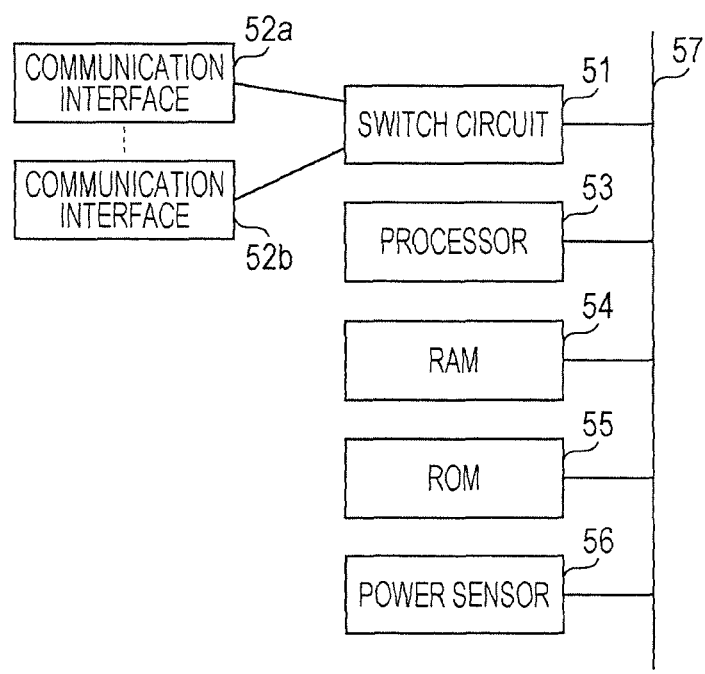

FIG. 7A

| TRANSMISSION SOURCE | DESTINATION | DATA AMOUNT |
|---|---|---|
| CL1 | CL2 | d BYTE |

FIG. 7B

| TRANSMISSION SOURCE | DESTINATION | DATA AMOUNT | PASSING TRANSFER APPARATUSES |
|---|---|---|---|
| CL1 | CL2 | d BYTE | 20a, 20b, 20d |

FIG. 8A

| Controller_ID | Node_ID | REQUEST FLAG | POWER MODEL |
|---|---|---|---|

FIG. 8B

| TRANSFER AMOUNT | POWER |
|---|---|
| 0 | 10 W |
| 100 M | 15 W |
| 1 G | 20 W |
| ... | ... |

FIG. 8C

| Controller_ID | Node_ID | REQUEST FLAG | TRANSFER AMOUNT |
|---|---|---|---|

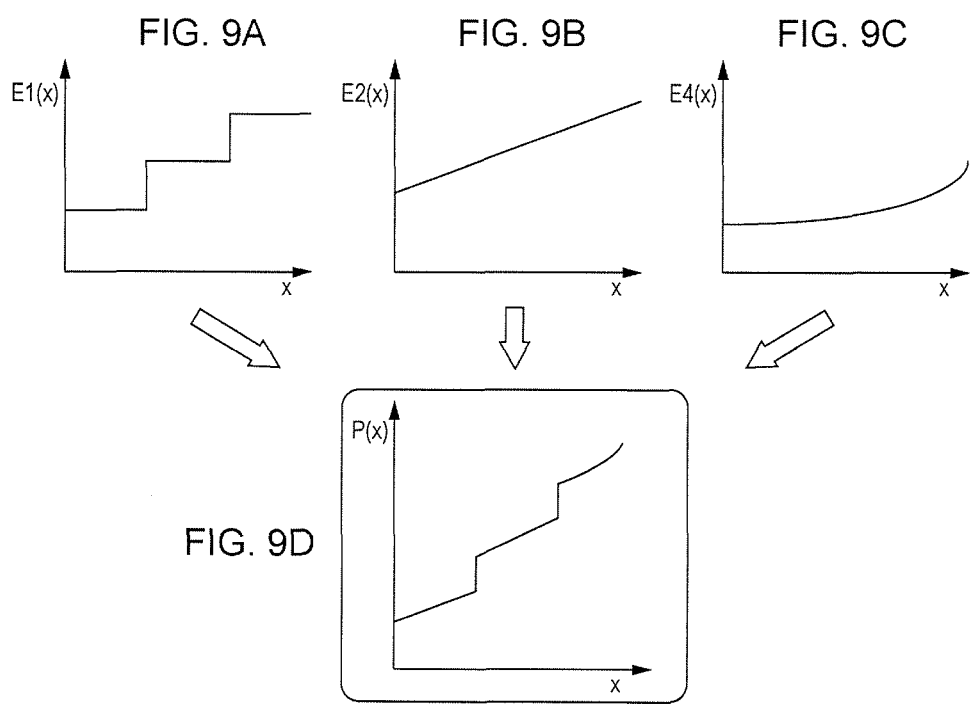

FIG. 10A

| TRANSFER AMOUNT PER UNIT TIME | POWER CONSUMPTION |
|---|---|
| F1 | P1 |
| F2 | P2 |
| F3 | P3 |

FIG. 10B

| TRANSFER AMOUNT PER UNIT TIME | TRANSFER TIME |
|---|---|
| F1 | d/F1 |
| F2 | d/F2 |
| F3 | d/F3 |

FIG. 10C

| TRANSFER AMOUNT PER UNIT TIME | POWER CONSUMPTION DURING TRANSFER |
|---|---|
| F1 | P1 × d/F1 |
| F2 | P2 × d/F2 |
| F3 | P3 × d/F3 |

FIG. 12A

| Controller_ID | Node_ID | TRANSMISSION SOURCE OF TARGET DATA | DESTINATION OF TARGET DATA | TRANSFER RATE |

FIG. 12B

| Controller_ID | Node_ID | TRANSMISSION SOURCE OF TARGET DATA | TRANSMISSION SOURCE PORT NUMBER | DESTINATION OF TARGET DATA | DESTINATION PORT NUMBER | TRANSFER RATE |

FIG. 17A

| Controller_ID | ADDRESS OF COMMUNICATION APPARATUS AT TRANSMISSION SOURCE | POWER SAVING SETTING FLAG |
|---|---|---|

FIG. 17B

| COMMUNICATION APPARATUS AT TRANSMISSION SOURCE | POWER SAVING SETTING |
|---|---|
| UE1 | O |
| UE2 | × |
| UE3 | O |
| UE4 | × |
| ... | ... |

BANDWIDTH CONTROL APPARATUS, BANDWIDTH CONTROL METHOD, AND BANDWIDTH CONTROL PROGRAM

CROSS-REFERENCE TO RELATED APPLICATION

This application is based upon and claims the benefit of priority of the prior Japanese Patent Application No. 2012-166839, filed on Jul. 27, 2012, the entire contents of which are incorporated herein by reference.

FIELD

The embodiments discussed herein are related to a control on a bandwidth used for transmission and reception of data between plural node apparatuses.

BACKGROUND

Since power consumption in an entire network is increased along with an increase in communication traffic, it is desirable to improve a power efficiency at the time of a communication. In view of the above, a method of determining a route when a communication is started in accordance with electric energy used for the communication is proposed. For example, plural routes are calculated as candidates when a packet transfer is conducted. One candidate among the plural routes is selected where the increase is low in the power consumption when the packet transfer is conducted. According to this method, a route calculation apparatus calculates increased amounts of power consumption in the network at a time when a path is set with regard to plural candidates of transfer routes from a starting point to a terminal point of the path to be set and determines the transfer route of the route in accordance with the calculated increased amounts.

A system is also proposed in which an increased amount of link power consumption due to a request flow is estimated, and a cost value is set on the basis of the increased amount of the link power consumption, so that a route where a total sum of the cost values is the lowest is determined as a route of the request flow. A route calculation method is further proposed in which a cost value of a route from one transfer apparatus to the other transfer apparatus is defined as a sum of power consumptions in the respective transfer apparatuses, and a route set between the transfer apparatus serving as a starting point and the transfer apparatus serving as a terminal point is determined on the basis of the cost value.

Japanese Laid-open Patent Publication No. 2008-219067, Japanese Laid-open Patent Publication No. 2011-199836, and Japanese Laid-open Patent Publication No. 2008-311830 are examples of related art.

SUMMARY

According to an aspect of the invention, a control apparatus includes a reception unit configured to receive information including information of a transmission source, an amount of target data to be transmitted, and a destination; an identification unit configured to identify a transfer apparatus included in a route from the transmission source to the destination; a calculation unit configured to calculate a power consumption based on a transfer rate at which the transfer apparatus performs a transfer, power consumed by the transfer apparatus, and the amount of target data; a determination unit configured to determine a transfer rate corresponding to the power consumption calculated by the calculation unit; and a transmission unit configured to transmit a transfer request for requesting a transfer of the target data at the determined transfer rate to the transfer apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a configuration example of a transfer apparatus;

FIG. 6 illustrates a hardware configuration example of the transfer apparatus;

FIG. 7A and FIG. 7B illustrate examples of a transmission start notification and data held by an identification unit;

FIG. 8A, FIG. 8B, and FIG. 8C illustrate examples of a control packet;

FIG. 9A, FIG. 9B, FIG. 9C, and FIG. 9D illustrate calculation examples of a consumption power model;

FIG. 10A, FIG. 10B, and FIG. 10C illustrate examples of a calculation by a determination unit;

FIG. 12A and FIG. 12B illustrate examples of information elements included in a transfer request;

FIG. 17A and FIG. 17B illustrate an example of a power saving notification and an example of a table for identifying a transmission source of the power saving notification.

DESCRIPTION OF EMBODIMENTS

The power efficiency in the communication may fluctuate depending on the bandwidth used for the transfer of the transmitted and received data. However, a method of obtaining a bandwidth at which the power consumed in the route becomes relatively low has not yet been proposed.

Therefore improvement on the power efficiency in the communication through an adjustment of the bandwidth is preferable.

Figure 1A:
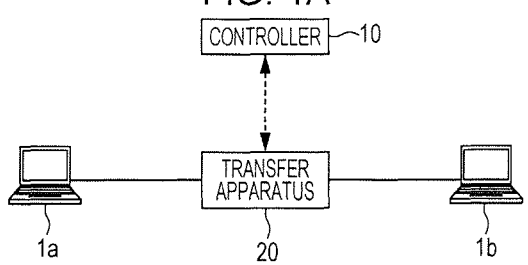
FIG. 1A and FIG. 1B illustrate examples of a network.

FIG. 1A illustrates a network example. The network illustrated in FIG. 1A includes communication apparatuses 1 (1a and 1b), a controller 10, and a transfer apparatus 20. The transfer apparatus 20 is included in a route from the communication apparatus 1a to the communication apparatus 1b, and the controller 10 is connected so as to communicate with the transfer apparatus 20. Hereinafter, with reference to FIG. 1A, a description will be given of processing carried out by the controller 10 in a case where data transmission is started from the communication apparatus 1a at a transmission source to the communication apparatus 1b at a destination. Hereinafter, the data started to be transmitted from the communication apparatus 1a to the communication apparatus 1b is referred to as "target data" to be distinguished from data transmitted and received in other communications.

Figure 2:
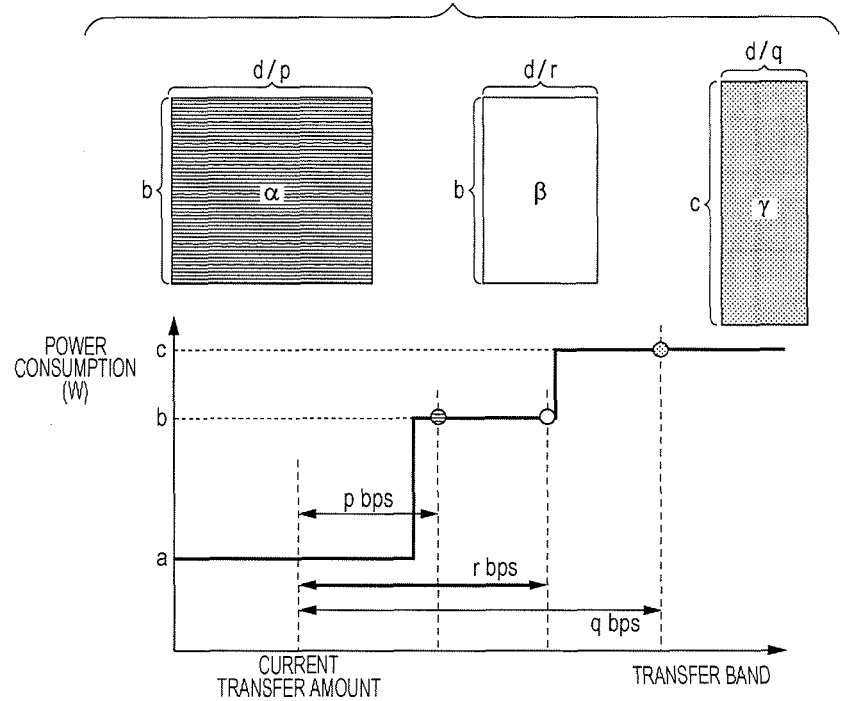
FIG. 2 is an explanatory diagram for describing an example of a method according to an embodiment.

FIG. 2 is an explanatory diagram for describing an example of a method according to an embodiment. When the target data is transmitted from the communication apparatus 1a towards the communication apparatus 1b, the data processed in the transfer apparatus 20 is increased by the amount of the target data. In view of the above, the controller 10 obtains a transfer rate of the target data at which the power consumption in the transfer apparatus 20 is minimized.

For example, the power consumption fluctuates in the transfer apparatus 20 in accordance with the amount of data transferred per unit time (transfer rate) as illustrated in a graphical representation of FIG. 2. The transfer apparatus 20 consumes power of a watts in a state in which the transfer of the target data is not conducted. The transfer apparatus 20 consumes power of b watts when the target data is transferred at a speed of p bits per second (bps) without changing the transfer speed with regard to the data being transferred. The power consumed by the transfer apparatus 20 is still b watts even when the transfer speed of the target data (transfer rate) is r (bps). When the transfer apparatus 20 transfers the target data at q bits per second without changing the transfer speed with regard to the data being transferred, the power consumption is c watts.

The controller 10 obtains the power consumption of the transfer apparatus 20 during the transfer of the target data while it is assumed that the power consumption per unit time does not change during the transfer of the target data. The electric energy consumed during the transfer of the target data is a product of the power consumption of the transfer apparatus 20 and a time spent for the transfer of the target data. The target data amount is set as d bits, for example. At this time, when a transmission speed of the target data is p (bps), the time spent for the transmission of the target data is d/p second. Therefore, the electric energy consumed during the transmission of the target data is b×d/p (W seconds). The power consumption in a case where the transmission speed of the target data is p (bps) corresponds to an area of α in FIG. 2 when the area is represented as a rectangular in which a horizontal width represents a time and a vertical axis represents electric power. Similarly, in a case where the transmission speed of the target data is r (bps), since the electric energy consumed during the transmission of the target data is b×d/r (W second), the power consumption is represented as an area of β in FIG. 2. Similarly, in a case where the transmission speed of the target data is q (bps), since the electric energy consumed during the transmission of the target data is c×d/q (W second), the power consumption is represented as an area of γ in FIG. 2.

The controller 10 determines the transfer rate of the target data so that the power consumption during the transfer of the target data is a relatively low value. For example, the controller 10 can determine the transfer rate of the target data so that the power consumption during the transfer of the target data is minimized. The controller 10 notifies the transfer apparatus 20 of the determined transfer rate. The transfer apparatus 20 transfers the target data by using the transfer rate notified from the controller 10 so that it is possible to suppress the consumption of the electric energy in the network. For example, in a case where a minimum value of the electric energy consumed during the transmission of the target data is a value represented as the area of β, the controller 10 requests the transfer apparatus 20 to transmit the target data at r (bps), and the transfer apparatus 20 transfers the target data at r (bps) to the communication apparatus 1b.

The controller 10 determines the transfer rate of the data transmitted and received in the newly established communication in accordance with the power consumption of the transfer apparatus 20 included in the route in the above-mentioned manner, and the transfer apparatus 20 performs the transfer at the transfer rate notified from the controller 10, so that the power consumption efficiency can be improved. The controller 10 may also avoid the calculation related to the power consumption of a link that is not included in the route. For this reason, as compared with a case in which the power consumption is calculated for plural routes, the amount of calculations conducted by the controller 10 is reduced. To facilitate the understanding, the network illustrated in FIG. 1A has been described as an example herein, but the number of the transfer apparatuses 20 in the network is an arbitrary integer higher than or equal to 1, and the number of the communication apparatuses 1 is an arbitrary integer higher than or equal to 2. For example, similar processing to that in the network of FIG. 1A may be carried out in the network illustrated in FIG. 1B.

Apparatus Configuration

Figure 3:
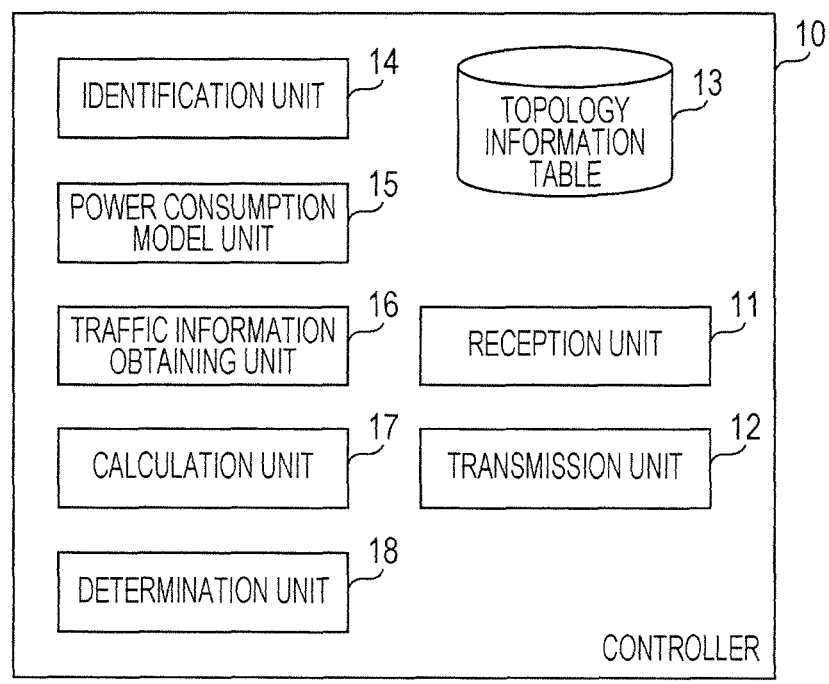
FIG. 3 illustrates a configuration example of a control apparatus.

FIG. 3 illustrates a configuration example of the controller 10. The controller 10 is provided with a reception unit 11, a transmission unit 12, a topology information table 13, an identification unit 14, a power consumption model unit 15, a traffic information obtaining unit 16, a calculation unit 17, and a determination unit 18. The reception unit 11 receives a packet transmitted from the communication apparatus 1 and the transfer apparatus 20 in the network. The transmission unit 12 transmits the packet to the transfer apparatus 20 or the like in the network. The topology information table 13 holds information for identifying apparatuses connected to the respective apparatuses with regard to the communication apparatus 1 and the transfer apparatus 20 in the network. The identification unit 14 obtains a route from the communication apparatus 1 at the data transmission source in the newly started communication to the communication apparatus 1 at the destination and identifies the transfer apparatus 20 included in the route. In the following description, the data transmitted in the newly started communication will be described as "target data". The identification unit 14 uses the topology information table 13 when the route is obtained. The identification unit 14 outputs an identifier for identifying the transfer apparatus 20 included in the route to the power consumption model unit 15 and the traffic information obtaining unit 16.

The power consumption model unit 15 obtains a relationship between the power consumption in the transfer apparatus 20 and the amount of data transferred per unit time from the transfer apparatus 20 identified by the identification unit 14. In the following description, the information indicating relationship between the power consumption in the transfer apparatus 20 and the amount of data transferred per unit time will be described as "power consumption model". The traffic information obtaining unit 16 obtains information indicating the amount of data being transferred by the transfer apparatus 20 from the transfer apparatus 20 included in the route. The traffic information obtaining unit 16 outputs the obtained information to the calculation unit 17. The operations by the power consumption model unit 15 and the traffic information obtaining unit 16 will be described in detail below. The data amount transferred per unit time on the network may be described as "traffic" in the following description.

The calculation unit 17 uses the data input from the traffic information obtaining unit 16 and calculates the power consumed during the transfer of the target data corresponding to the transfer speed on the basis of the relationship between the transfer speed of the target data and the transfer apparatus 20 corresponding to the power consumption model obtained by the power consumption model unit 15. At this time, in a case where the plural transfer apparatuses 20 are included in the route, the calculation unit 17 calculates a total value of the power consumptions in all the transfer apparatuses 20 as a function of the transfer speed. The determination unit 18 uses the calculation result of the calculation unit 17 and determines the transfer speed at which the power consumption is minimized. The determination unit 18 generates a transfer request message for requesting the transfer apparatus 20 to perform the transfer of the target data at the determined transfer speed. The determination unit 18 transmits the transfer request message via the transmission unit 12 to the transfer apparatus 20.

Figure 4:
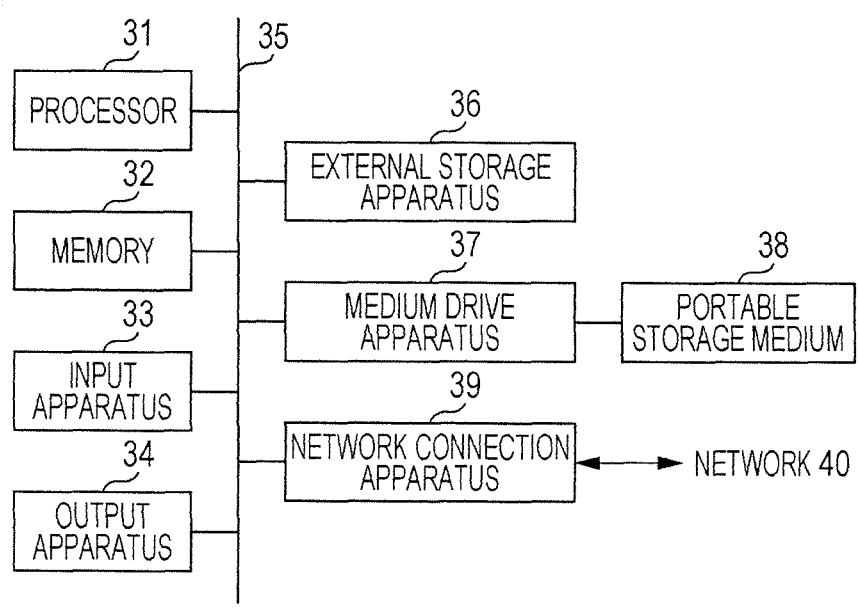
FIG. 4 illustrates a hardware configuration example of the control apparatus.

FIG. 4 illustrates a hardware configuration example of the controller 10. The controller 10 is provided with a processor 31, a memory 32, an input apparatus 33, an output apparatus 34, a bus 35, an external storage apparatus 36, a medium drive apparatus 37, and a network connection apparatus 39. The controller 10 may be realized by a computer or the like, for example.

The processor 31 can be composed of an arbitrary processing circuit including a central processing unit (CPU). The processor 31 operates as the identification unit 14, the power consumption model unit 15, the traffic information obtaining unit 16, the calculation unit 17, and the determination unit 18. The processor 31 can execute a program stored, for example, in the external storage apparatus 36.

The memory 32 stores the topology information table 13. The memory 32 further appropriately store data obtained through the operation by the processor 31 and data used for the processing by the processor 31. For example, the memory 32 can also hold the power consumption model obtained by the power consumption model unit 15 and the information on the route obtained by the identification unit 14. The network connection apparatus 39 performs processing for the communication with the communication apparatus 1 and the transfer apparatus 20 included in a network 40 and operates as the reception unit 11 and the transmission unit 12.

The input apparatus 33 is realized, for example, by a button, a key board, or a mouse, and the output apparatus 34 is realized as a display or the like. The bus 35 connects the processor 31, the memory 32, the input apparatus 33, the output apparatus 34, the external storage apparatus 36, the medium drive apparatus 37, and the network connection apparatus 39 to each other so that the data can mutually be exchanged. The external storage apparatus 36 stores a program, data, and the like and appropriately supplies the stored information to the processor 31 and the like. The medium drive apparatus 37 can output the data in the memory 32 or the external storage apparatus 36 to a portable storage medium 38 and also read out the program, the data, and the like from the portable storage medium 38. Herein, the portable storage medium 38 may be composed of an arbitrary portable storage medium including a flexible disk, a magneto-optical (MO) disc, a compact disc recordable (CD-R), and a digital versatile disk recordable (DVD-R).

FIG. 5 illustrates a configuration example of the transfer apparatus 20. The transfer apparatus 20 is provided with a reception unit 21, a transmission unit 22, a transfer amount measurement unit 23, a power consumption measurement unit 24, a bandwidth control unit 25, and a switching unit 26. The reception unit 21 receives a packet transmitted from the communication apparatus 1 or the controller 10 in the network. The transmission unit 22 transmits the packet to the communication apparatus 1 or the controller 10 in the network. The transfer amount measurement unit 23 measures the amount of data transferred by the transfer apparatus 20. The power consumption measurement unit 24 measures the power consumed by the transfer apparatus 20. The switching unit 26 transfers the packet by performing switching processing. The switching unit 26 is provided with a buffer and can appropriately hold the packet.

The bandwidth control unit 25 performs processing for transferring the target data at the transfer rate notified from the controller 10. The bandwidth control unit 25 checks whether or not the packet received from the communication apparatus 1 includes the data where the transfer rate is specified by the controller 10. For example, in a case where the transmission source and the destination are matched with the communication where the transfer rate is specified by the controller 10, the bandwidth control unit 25 can determine that the received packet includes the target data. The bandwidth control unit 25 adjusts the processing amount by the switching unit 26 with regard to the packet including the target data and the holding amount by the packet including the target data with regard to the switching unit 26 so that the transmission speed of the target data is the transfer rate specified by the controller 10. For example, it is assumed that the transfer of the target data is faster than the speed represented by the transfer rate when all the received packets are transferred. In this case, the bandwidth control unit 25 adjusts the switching unit 26 by discarding a part of the packet including the target data so that the target data is transferred at the transfer rate.

FIG. 6 illustrates a hardware configuration example of the transfer apparatus 20. The transfer apparatus 20 is provided with a switch circuit 51, communication interfaces 52 (52a and 52b), a processor 53, a random access memory (RAM) 54, a read only memory (ROM) 55, a power sensor 56, and a bus 57. The transfer apparatus 20 may be realized as a switch apparatus, for example. The switch circuit 51 operates as the switching unit 26. The communication interfaces 52 operate as the reception unit 21 and the transmission unit 22. The transfer amount measurement unit 23, the power consumption measurement unit 24, and the bandwidth control unit 25 are realized by the processor 53. The measurement on the transfer amount in the transfer amount measurement unit 23 is carried out while the processor 53 accesses the switch circuit 51. The measurement on the power consumption in the power consumption measurement unit 24 is carried out while the processor 53 accesses the power sensor 56. The RAM 54 stores the data obtained through the processing by the processor 53 and the data used for the processing by the processor 53. The ROM 55 stores the program, the data, and the like and appropriately supplies the stored information to the processor 53 and the like.

For example, the power consumption model of the transfer apparatus 20 may be stored in the ROM 55. The power sensor 56 measure the power used in the transfer apparatus 20.

First Embodiment

Figure 1B:
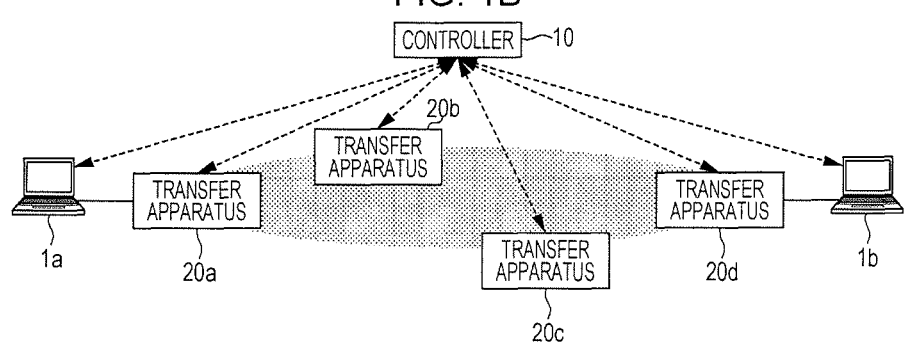

Hereinafter, a description will be given of processings conducted by the controller 10 and the transfer apparatus 20 in a case where a communication is newly started between the communication apparatus 1a and the communication apparatus 1b illustrated in FIG. 1B and the target data is transmitted from the communication apparatus 1a to the communication apparatus 1b, for example. With regard to the communication apparatus 1, FIG. 1B illustrates only the communication apparatus 1a and the communication apparatus 1b, but the communication apparatuses 1 other than the communication apparatuses 1a and 1b exist in the network and conduct communications. In the following description, an identifier of the communication apparatus 1a is set as CL1, and an identifier of the communication apparatus 1b is set as CL2.

(1) The communication apparatus 1a notifies the controller 10 of the identifier of the communication apparatus 1a, the identifier of the communication apparatus 1b at the communication destination, and the amount of data (target data) transmitted from the communication apparatus 1a to the communication apparatus 1b when the communication is started. For example, it is assumed that the size of the target data is d bytes. The communication apparatus 1a then transmits a communication start notification including information elements illustrated in FIG. 7A to the controller 10.

(2) The reception unit 11 of the controller 10 receives a transmission start notification. The identification unit 14 calculates a route from the communication apparatus 1a to the communication apparatus 1b by using the information included in the transmission start notification and the topology information table 13. An arbitrary route calculation method can be used as a method for the identification unit 14 to calculate the route at this time. For example, the identification unit 14 can search for a shortest route by using a protocol such as open shortest path first (OSPF). The identification unit 14 identifies the obtained transfer apparatus 20 included in the route and identifies an identifier of the identified transfer apparatus 20 by using the topology information table 13. The identification unit 14 outputs the identifier of the identified transfer apparatus 20 to the power consumption model unit 15.

It is assumed, for example, that the identification unit 14 determines a route from the communication apparatus 1a via the transfer apparatuses 20a, 20b, and 20d to the communication apparatus 1b as a route used for the transmission of the target data. The identification unit 14 can hold data illustrated in FIG. 7B by obtaining the route.

(3) The power consumption model unit 15 searches for the address of the transfer apparatus 20 in the network by using the identifier notified from the identification unit 14 as a key to obtain the address of the transfer apparatus 20 included in the route that is calculated in the identification unit 14. The information on the address of the transfer apparatus 20 in the network may be included in the topology information table 13 at this time. The power consumption model unit 15 enquires the transfer apparatus 20 included in the route on a relationship between the transfer amount per unit time and the power consumption of the transfer apparatus 20. In the following description, a control packet used for obtaining the relationship between the transfer amount per unit time and the power consumption may be described as "power model request".

The power model request includes, for example, information elements illustrated in FIG. 8A. That is, the power model request can includes a Controller_ID field, a Node_ID field, the request flag, and a power consumption model field. The Controller_ID field stores an address allocated to the controller 10. The Node_ID field stores an address of the transfer apparatus 20 corresponding to the destination of the control packet. The request flag indicates whether the control packet is a packet for notifying the power consumption model unit 15 of the power model request or the power consumption model. Hereinafter, the packet for notifying the power consumption model unit 15 of the power consumption model may be described as "power model notification". Herein, the request flag=0 corresponds to the power model request, and the request flag=1 corresponds to the power model notification. A power consumption model field of the control packet transmitted from the controller 10 does not include information on the power consumption model. Therefore, for example, the power model request generated by the power consumption model unit 15 can be represented as follows.

Controller_ID field: Address of the controller 10
Node_ID field: Address of the transfer apparatus 20a
Request flag: 0
Power consumption model field:—(Invalid value)

The power consumption model unit 15 outputs the generated power model request to the transmission unit 12, and the transmission unit 12 transmits the power model request to the transfer apparatus 20 to which the address of the Node_ID field is allocated. For example, the above-mentioned power model request is transmitted towards the transfer apparatus 20a.

(4) When the power model request is received, the reception unit 21 of the transfer apparatus 20a outputs the power model request to the bandwidth control unit 25. The bandwidth control unit 25 generates the power model notification including the power consumption model used in the transfer apparatus 20a. In the power model notification, the transfer amount per unit time and the power consumption corresponding to the transfer amount are recorded in the power consumption model field. FIG. 8B illustrates an example of the information on the power consumption model included in the power model notification. In the example illustrated in FIG. 8B, the transfer apparatus 20 consumes power at 10 W in a case where the transfer amount per unit time is below 100 Mbps. The transfer apparatus 20 consumes power at 15 W while the transfer amount per unit time is from 100 Mbps to 1 Gbps. The bandwidth control unit 25 outputs the generated power model notification to the transmission unit 22. The transmission unit 22 transmits the power model notification towards the controller 10.

(5) The reception unit 11 of the controller 10 outputs the power model notification received from the transfer apparatus 20a to the power consumption model unit 15. The power consumption model unit 15 obtains and holds the power consumption model from the information included in the power model notification while being associated with the identifier for identifying the transfer apparatus 20 at the transmission source of the power model notification.

(6) The power consumption model unit 15 obtains the power consumption model by transmitting the power model request to all the transfer apparatuses 20 included in the route. Processing conducted when the power consumption model is obtained is similar to the procedures (3) to (5) for any of the transfer apparatuses 20.

(7) The traffic information obtaining unit 16 obtains the address of the transfer apparatus 20 included in the route calculated in the identification unit 14 similarly as in the power consumption model unit 15. The traffic information obtaining unit 16 further generates the control packet for enquiring the transfer apparatus 20 in the route on the amount of data being transferred. In the following description, the control packet for enquiring the transfer apparatus 20 in the route on the amount of data being transferred may be described as "traffic information request".

FIG. 8C illustrates an example of the traffic information request. In the example of FIG. 8C, the traffic information request includes the Controller_ID field, the Node_ID field, the request flag, and a transfer amount field. The request flag is used for distinguishing the traffic information request from the notification of the transfer amount (traffic notification) from the transfer apparatus 20 to the controller 10. The request flag=2 corresponds to the traffic information request, and the request flag=3 corresponds to the traffic notification. The transfer amount field holds a value indicating the amount of data transferred by the transfer apparatus 20 per unit time. In the traffic information request, the transfer amount field holds an invalid value. With regard to the Controller_ID field and the Node_ID field, information similar to that of the control packet illustrated in FIG. 8A is held. The traffic information obtaining unit 16 of the transfer apparatus 20a can generate the traffic information request including the following information elements, for example.

Controller_ID field: Address of the controller 10
Node_ID field: Address of the transfer apparatus 20a
Request flag: 2
Transfer amount field:—(Invalid value)

The traffic information obtaining unit 16 outputs the generated traffic information request to the transmission unit 12. The transmission unit 12 transmits the traffic information request to the transfer apparatus 20 to which the address of the Node_ID field is allocated. For example, the above-mentioned traffic information request is transmitted towards the transfer apparatus 20a.

(8) When the traffic information request is received, the reception unit 21 of the transfer apparatus 20a outputs the traffic information request to the power consumption measurement unit 24. The power consumption measurement unit 24 generates the traffic notification including the amount of data transferred per unit time in the transfer apparatus 20a. In the traffic notification, the transfer amount per unit time is recoded in the transfer amount field. The power consumption measurement unit 24 outputs the generated traffic notification to the transmission unit 22. The transmission unit 22 transmits the traffic notification towards the controller 10.

(9) The reception unit 11 of the controller 10 outputs the traffic notification received from the transfer apparatus 20a to the traffic information obtaining unit 16. The traffic information obtaining unit 16 obtains and holds the amount of data transferred by the transfer apparatus 20a per unit time from the information included in the traffic notification while being associated with the identifier for identifying the transfer apparatus 20 at the transmission source of the traffic notification.

(10) The traffic information obtaining unit 16 obtains the amount of data transferred per unit time by transmitting to the traffic information request all the transfer apparatuses 20 included in the route. Processing conducted when the amount of data transferred per unit time is obtained is similar to the procedures (7) to (9) for any of the transfer apparatuses 20.

(11) The calculation unit 17 obtains a relationship between the total value of the power consumptions of the transfer apparatuses 20 in the route and the transfer amount by using the information obtained by the power consumption model unit 15. For example, it is assumed that when the transfer amount is x bps, the power consumption in the transfer apparatus 20a is $E1(x)$, the power consumption in the transfer apparatus 20b is $E2(x)$, and the power consumption in the transfer apparatus 20d is $E4(x)$. Accordingly, the calculation unit 17 calculates the power consumption in the transfer apparatuses 20 in the route when the transfer amount is x bps as $E1(x)+E2(x)+E4(x)$.

FIG. 9A, FIG. 9B, FIG. 9C, and FIG. 9D illustrate calculation examples of the power consumption model. For example, FIG. 9A illustrates the power consumption model of the transfer apparatus 20a, FIG. 9B illustrates the power consumption model of the transfer apparatus 20b, and FIG. 9C illustrates the power consumption model of the transfer apparatus 20d. The calculation unit 17 thus obtains a graphic representation illustrated in FIG. 9D as the power model in a case where all the transfer apparatuses 20a, 20b, and 20d transfer the same amount of data. The calculation unit 17 outputs the obtained graphic representation to the determination unit 18.

(12) The determination unit 18 calculates the transfer amounts of the respective transfer apparatuses 20 from the traffic information obtaining unit 16 and uses the graphic representation input from the calculation unit 17 to calculate the electric energy consumed during the transmission of the target data for each of the transfer amounts of the target data per unit time. The transfer amount of the target data per unit time may be described as "bandwidth used for the transfer of the target data".

FIG. 10A, FIG. 10B, and FIG. 10C illustrate calculation examples of the determination unit 18. For example, with regard to the target data, in a case where the transfer amount per unit time is F1 bits and the transfer amount of any of the transfer apparatuses 20 is x bps, the transfer apparatuses 20 (20a, 20b, and 20d) in the route correspond to x+F1 (bps). In view of the above, the determination unit 18 calculates the total value of the power consumptions in a case where the transfer amount per second is x+F1 (bit) from the graphic representation obtained by the calculation unit 17. The obtained total value of the power consumptions herein is set as P1 watts. The determination unit 18 subsequently calculates a total value of the power consumptions in the transfer apparatuses 20 by changing the transfer amount of the target data per unit time. At this time, when the bandwidth used for the transfer of the target data is F2 bits, the total value of the power consumptions in the transfer apparatuses 20 in the route is P2 watts, and when the bandwidth is F3 bits, the total value of the power consumptions in the transfer apparatuses 20 in the route is P3 watts. FIG. 10A therefore illustrates the relationship between the transfer amount of the target data per unit time and the power consumption. It is noted that F1<F2<F3 and also P1<P2<P3 are established.

As the bandwidth used for the transfer of the target data is wider, the time spent for the transmission of the target data is shorter. When the data amount of the target data is d bits, in a case where the bandwidth used for the transfer of the target data is F1, the time spent for the transmission of the target data is d/F1 (second). The electric energy consumed in the transfer apparatus 20 included in the route where the target data is transferred while the target data is transferred at the bandwidth of F1 (bps) is P1×d/F1. Also, in a case where the bandwidth is not F1, the determination unit 18 similarly calculates the electric energy consumed in the transfer apparatus 20 in the transmission route for the target data while the time spent for the transmission of the target data and the target data are transmitted. FIG. 10B therefore illustrates the time spent for the transmission of the target data, and FIG. 10C therefore illustrates the electric energy consumed in the transfer apparatus 20 during a period while the target data is transmitted. The determination unit 18 calculates a relationship between the power consumption and the bandwidth used for the transmission of the target data from the calculation result illustrated in FIG. 10C.

Figure 11:
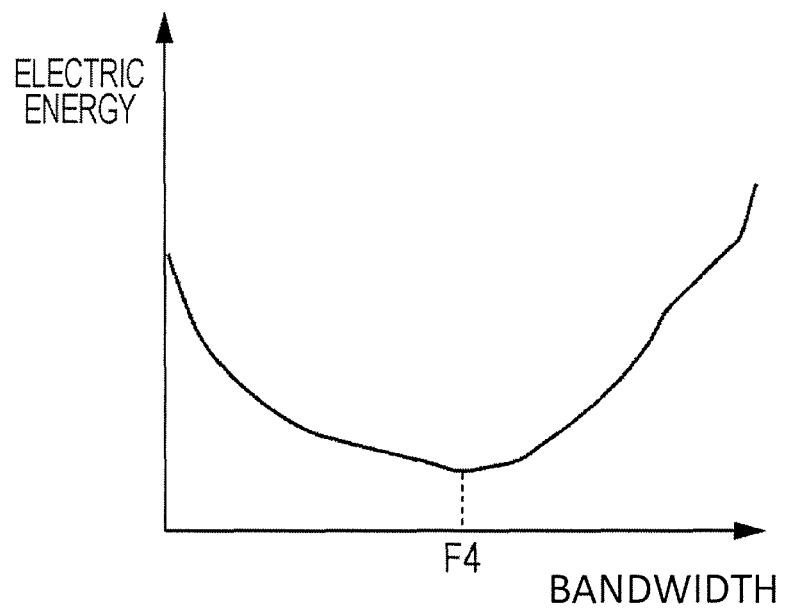
FIG. 11 illustrates an example of a relationship between electric energy consumed in the transfer apparatus in a route for target data and a bandwidth used for a transmission of the target data.

FIG. 11 illustrates an example of the relationship between the electric energy consumed in the transfer apparatus 20 in the route for the target data and the bandwidth used for the transmission of the target data. The determination unit 18 determines a bandwidth at which the power consumption is relatively low as a bandwidth applied to the transmission of the target data. For example, in the example of FIG. 11, the determination unit 18 determines the bandwidth used for the transmission of the target data as F4 (bps).

(13) The determination unit 18 generates a control packet for requesting the transfer of the target data by using the determined bandwidth. The control packet for requesting the transfer of the target data at the determined bandwidth may hereinafter be described as "transfer request". The determination unit 18 obtains the address of the transfer apparatus 20 that receives the target data from the transmission source of the target data from the identification unit 14 among the transfer apparatuses 20 included in the route used for the transmission of the target data. The determination unit 18 sets the transfer apparatus 20 notified from the identification unit 14 as the transmission destination of the transfer request. The determination unit 18 further obtains an address (transmission source address) allocated to the communication apparatus 1 at the transmission source of the target data and an address (destination address) allocated to the communication apparatus 1 at the destination of the target data from the identification unit 14. The identification unit 14 can identify the transmission source of the target data and the destination address by appropriately using the communication start notification received in the procedure (2). Herein, the transmission source address is an address allocated to the communication apparatus 1*a*, and the destination address an address allocated to the communication apparatus 1*b*.

FIG. 12A illustrates an example of information elements included in the transfer request. The transfer request includes the Controller_ID field, the Node_ID field, a transmission source address field, a destination address field, and a transfer rate field. Controller_ID is an address allocated to the controller 10, and Node_ID is an address allocated to the transfer apparatus 20 corresponding to the transmission destination of the transfer request. The transmission source address field stores the transmission source address of the target data, and the destination address field stores the destination address field of the target data. In the transfer rate field, information for identifying the bandwidth used for the transfer of the target data is recorded. The transfer request may also include a transmission source port number and a destination port number of the target data as illustrated in FIG. 12B. In the system using the transfer request of FIG. 12B, the target data is identified by using the information on the transmission source port and the destination port in addition to the transmission source address and the destination address. When the transfer request is generated, the determination unit 18 outputs the transfer request to the transmission unit 12.

(14) The transmission unit 12 transmits the transfer request to the transfer apparatus 20 to which the address held as Node_ID in the transfer request is allocated.

(15) The reception unit 21 of the transfer apparatus 20 outputs the received transfer request to the bandwidth control unit 25. The bandwidth control unit 25 obtains the bandwidth used for the transfer of the target data from the transfer request to be stored. In this example, the bandwidth control unit 25 stores the following data.

Transmission source address of the target data: Address of the communication apparatus 1*a*

Destination address of the target data: Address of the communication apparatus 1*b*

Bandwidth: F4 (bps)

(16) When the transmission of the transfer request is ended, the controller 10 transmits a signal for allowing the start of the target data transmission to the communication apparatus 1*a* at the transmission source.

(17) To transmit the target data towards the communication apparatus 1*b*, the communication apparatus 1*a* transmits the target data to the transfer apparatus 20*a*. The reception unit 21 of the transfer apparatus 20*a* notifies the bandwidth control unit 25 of the transmission source and the destination of the packet received from the communication apparatus 1*a*. The bandwidth control unit 25 uses the transmission source and the destination of the packet received from the communication apparatus 1 to check whether or not the transfer rate is specified by the controller 10. Since the destination of the data transmitted from the communication apparatus 1*a* is the communication apparatus 1*b*, the bandwidth control unit 25 determines that the target data is received. In view of the above, the bandwidth control unit 25 adjusts the processing amount by the switching unit 26 with regard to the packet including the target data and the holding amount by the packet including the target data with regard to the switching unit 26 so that the bandwidth used for the transfer of the target data is F4 (bps).

(18) After the processing by the bandwidth control unit 25, the switching unit 26 transfers the target data to the transfer apparatus 20*b* by using the bandwidth of F4 (bps). The transfer apparatus 20*b* transfers the target data transferred from the transfer apparatus 20*a* to the transfer apparatus 20*d*. The transfer apparatus 20*d* transfers the target data transferred from the transfer apparatus 20*b* to the communication apparatus 1*b*. At this time, in the transfer apparatuses 20*b* and 20*d*, the bandwidth of the target data is not adjusted. For this reason, the target data is transmitted to the communication apparatus 1*b* at the bandwidth adjusted by the transfer apparatus 20*a*.

It is noted that the procedures illustrated in the procedures (1) to (18) are examples. The controller 10 may obtain the transfer amount of the transfer apparatus 20 in the route ahead of the power consumption model, for example. A modification may also be made in which the processing by the power consumption model unit 15 and the processing by the traffic information obtaining unit 16 are carried out in parallel.

Figure 13:
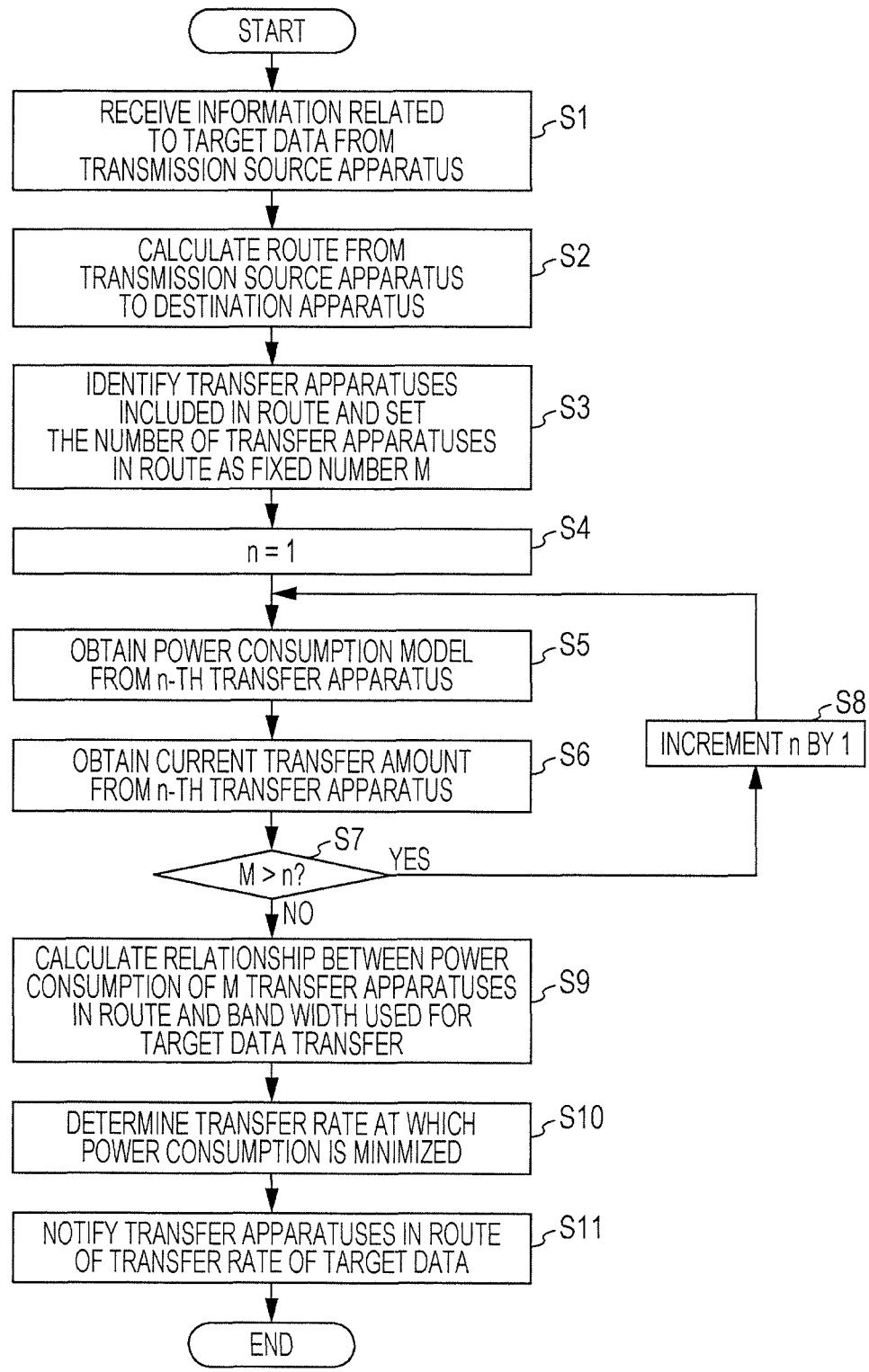
FIG. 13 is a flow chart for describing an example of processing carried out by the control apparatus.

FIG. 13 is a flow chart for describing an example of processing conducted by the controller 10. The reception unit 11 of the controller 10 receives information related to the target data from the communication apparatus 1 at the transmission source (step S1). Herein, the information related to the target data is provided with information for identifying the communication apparatus 1 at the transmission source of the target data and information for identifying the communication apparatus 1 at the destination of the target data, and the data amount of the target data. The identification unit 14 calculates a route from communication apparatus 1 at the transmission source to the communication apparatus 1 at the destination (step S2). The identification unit 14 identifies the transfer apparatuses 20 included in the calculated route and sets the number of the transfer apparatuses 20 in the route as a fixed number M (step S3). The power consumption model unit 15 sets a variable n as 1 (step S4). The power consumption model unit 15 obtains a power consumption model from the n-th transfer apparatus 20 (step S5). The traffic information obtaining unit 16a also obtains the data transfer amount per unit time from the n-th transfer apparatus 20 (step S6). When the data transfer amount is obtained by the traffic information obtaining unit 16, the power consumption model unit 15 determines whether or not the value of the fixed number M is higher than the variable n (step S7). In a case where the fixed number M is higher than the variable n, the power consumption model unit 15 increments n by 1, and the flow returns to step S5 (step S8). Until the value of the variable n is the same as the fixed number M, the power consumption model unit 15 and the traffic information obtaining unit 16 repeatedly perform the processing in steps S5 to S8 (step S7: Yes).

When the variable n is the same as the fixed number M, the calculation unit 17 calculates the relationship between the power consumption of the M transfer apparatuses 20 in the route and the bandwidth used for the transfer of the target data from the data amount of the target data and the power consumption model (step S7: No, step S9). The calculation unit 17 at this time appropriately uses the information obtained by the power consumption model unit 15 and the traffic information obtaining unit 16. The determination unit 18 uses the calculation result obtained by the calculation unit 17 to determine the bandwidth (transfer rate) used for the transfer of the target data so that the power consumption while the target data is transferred is minimized (step S10). The determination unit 18 notifies the transfer apparatus 20 that receives the target data from the communication apparatus 1 at the transmission source in the route of the transfer rate (step S11).

Figure 14:
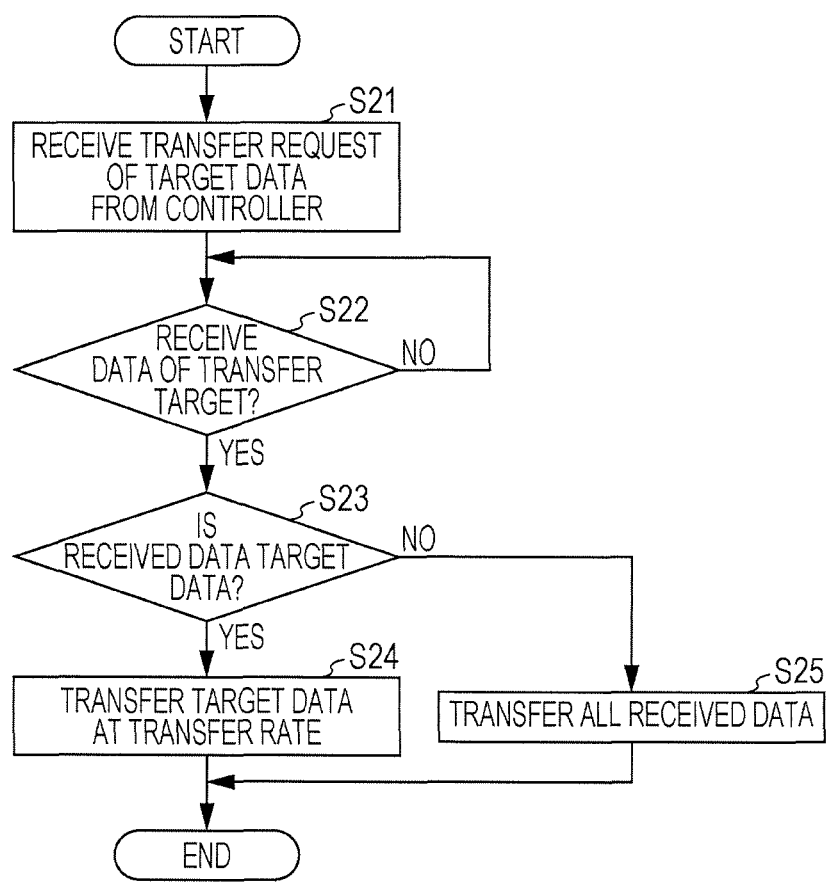
FIG. 14 is a flow chart for describing an example of processing carried out by the transfer apparatus.

FIG. 14 is a flow chart for describing an example of processing conducted by the transfer apparatus 20. The transfer apparatus 20 receives the transfer request regarding the target data from the controller 10 (step S21). The bandwidth control unit 25 obtains the transmission source, the destination, and the transfer rate of the target data from the information elements in the transfer request. The transfer apparatus 20 stands by until the reception unit 21 receives a packet (step S22). When the reception unit 21 receives the packet, the bandwidth control unit 25 uses the information obtained from the transfer request to determine whether or not the received packet contains the target data (step S23). In a case where the received packet contains the target data, the bandwidth control unit 25 adjusts a setting of the switching unit 26 so that the target data is transferred at the transfer rate notified through the transfer request (step S23: Yes). After that, the switching unit 26 transfers the target data at the transfer rate notified from the controller 10 (step S24). In a case where the received packet does not contain the target data, the switching unit 26 transfers all the received packets (step S23: No, step S25).

Thus, the controller 10 determines the transfer rate used for the transmission of the target data so that the power consumption during the transmission of the target data is relatively low by taking into account the power consumptions in all the transfer apparatuses 20 in the route. The transfer apparatus 20 transfers the target data at the transfer rate notified from the controller 10. For this reason, the use of the power over the entire route is more efficient.

Second Embodiment

The case in which the amounts of data transferred by all the transfer apparatuses 20 in the route are the same has been described as an example to facilitate the understanding according to the first embodiment. However, in a case where the transfer apparatuses 20 included in the transfer route for the target data are also included in a route for a communication between communication apparatuses other than the communication apparatuses at the transmission source of the target data and the destination, the individual transfer amounts of the transfer apparatuses 20 may vary from each other. In view of the above, according to a second embodiment, a description will be given of processing conducted by the calculation unit 17 in a case where the data amounts during the transfer vary among the transfer apparatuses 20. The controller 10 in the second embodiment may include those in the controller 10 in the first embodiments.

The method of calculating the route used for the transmission and reception of the target data and the method of obtaining the power consumption model and the transfer amount for each of the transfer apparatuses 20 are similar to those according to the first embodiment. The calculation unit 17 performs a calculation of Expression (1) by using the information obtained by the power consumption model unit 15 and the traffic information obtaining unit 16.

$$W(x) = \mathrm{Sum}(E_n(p_n+x) \times (d/x)) \quad (1)$$

In Expression (1), x represents a bandwidth of the target data. $W(x)$ indicates a total value of electric energy consumed in the transfer apparatuses 20 included in the route used for the transmission and reception of the target data when the bandwidth of the target data is x. The power consumption model of the n-th transfer apparatus 20 is represented as $E_n(p_n+x)$ when the amount of data transferred per unit time is set as $(p_n+x)$. $p_n$ indicates the amount of data currently transferred by the n-th transfer apparatus 20 per unit time. d indicates the amount of data included in the target data.

The calculation unit 17 obtains the value of $W(x)$ at a time when the value x of bandwidth of the target data is fluctuated and outputs the obtained value to the determination unit 18. The determination unit 18 performs a comparison among the input $W(x)$ and determines a value at which $W(x)$ is minimized as the transfer rate used for the transfer of the target data. The determination unit 18 uses the transfer request to transmit the determined transfer rate to the transfer apparatus 20 that receives the target data from the communication apparatus 1 at the transmission source. The transmission method for the transfer request and the operation by the transfer apparatus 20 that receives the transfer request are similar to those according to the first embodiment.

Third Embodiment

A case will be described in which the communication apparatus 1 at the transmission source specifies an allowable range of the transfer speed of the target data according to a third embodiment. The controller 10 in the second embodiment may include those in the controller 10 in the first embodiments.

Figure 15:
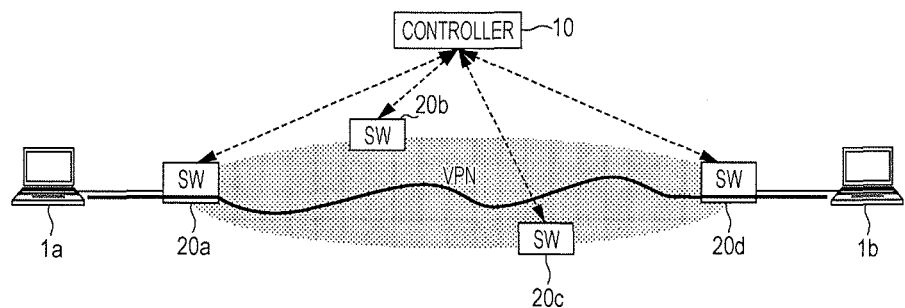
FIG. 15 illustrates a network example to which a third embodiment can be applied.

FIG. 15 illustrates an example of a network to which the third embodiment can be applied. In the example of FIG. 15, the transfer apparatus 20 is composed of a switch apparatus. The communication apparatus is transmits the transmission start request to the controller 10. At this time, the transmission start request includes information for identifying the transfer speed allowed by the communication apparatus 1a with regard to the target data. When the transmission start request is received, the identification unit 14 obtains the identifier of the communication apparatus 1a, the identifier of the communication apparatus 1b at the communication destination, the target data amount, and the allowable transfer speed. The identification unit 14 notifies the determination unit 18 of the notified transfer speed.

The identification on the route used for the transmission and reception of the target data and the obtainment of the power consumption model of the transfer apparatus 20 included in the route and the transfer data amount are similar to those according to the first or second embodiment. Furthermore, the operation by the calculation unit 17 and the determination on the transfer rate in the determination unit 18 are also similar to those according to the first or second embodiment.

After the transfer rate is obtained, the determination unit 18 determines whether or not the obtained transfer rate is within a range of the allowable transfer speed. The determination unit 18 notifies the transfer apparatus 20 of the transfer request including the transfer rate in a case where the obtained transfer rate is within the range of the allowable transfer speed. On the other hand, in a case where the obtained transfer rate is not within the range of the allowable transfer speed, the determination unit 18 obtains the transfer speed at which the power consumption is minimized within the allowable transfer speed on the basis of the calculation result of the calculation unit 17. The determination unit 18 transmits the transfer speed at which the power consumption is minimized within the range of the allowable transfer speed while being included in the transfer request to the transfer apparatus 20. In the example of FIG. 15, while the controller 10 notifies all the transfer apparatuses 20 in the route of the obtained route and the transfer rate, the target data is transmitted via virtual private network (VPN) between the communication apparatus 1a at the transmission source and the communication apparatus 1b at the destination.

Figure 16:
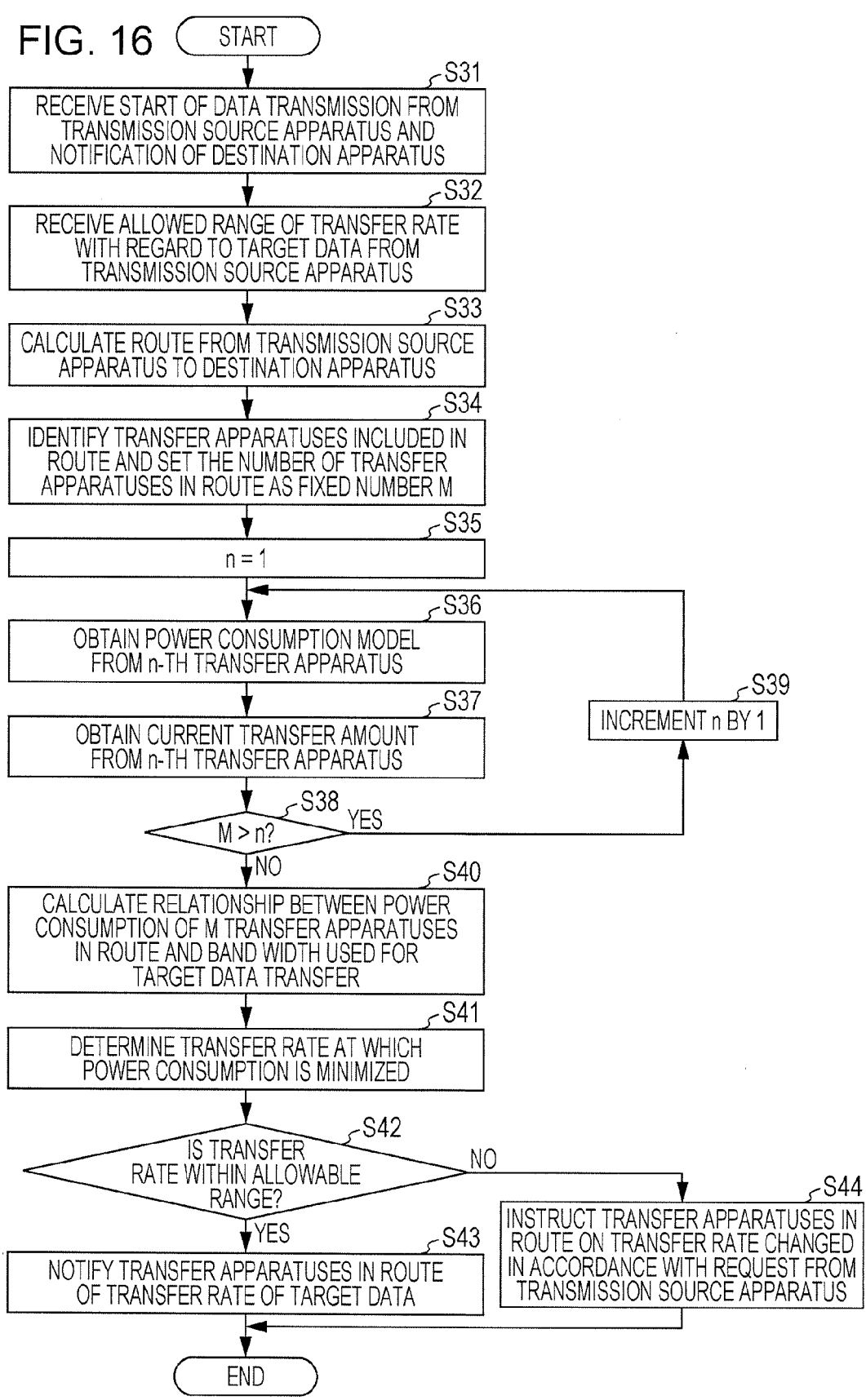
FIG. 16 is a flow chart for describing an example of processing carried out by the control apparatus according to the third embodiment.

FIG. 16 is a flow chart for describing an example of processing conducted by the control apparatus according to the third embodiment. FIG. 16 is an example and may be changed in accordance with the mounting in some cases. For example, the notification of the transmission start request is different from the notification of the allowable transfer speed in the example of FIG. 16, but as described with reference to FIG. 15, step S31 and step S32 can be set as a single operation conducted when the transmission start request is received. In addition, the order of step S36 and step S37 can also be changed.

The identification unit 14 of the controller 10 identifies the start of the target data transmission and the notification of the communication apparatus 1 at the destination by using the notification from the communication apparatus 1 at the transmission source (step S31). The identification unit 14 further identifies a transmission speed that is allowed by the communication apparatus 1 at the transmission source with regard to the target data by using the notification received from the communication apparatus 1 at the transmission source (step S32). The identification unit 14 notifies the determination unit 18 of the identified transmission speed.

The processing in steps S33 to S41 is similar to the processing in steps S2 to S10 described with reference to FIG. 13. The determination unit 18 determines whether or not the determined transfer rate is within the range of the allowable transfer speed (step S42). The determination unit 18 notifies the transfer apparatus 20 in the route of the transfer rate in a case where the determined transfer rate is within the range of the allowable transfer speed (step S43). On the other hand, in a case where the determined transfer rate is not within the range of the allowable transfer speed, the determination unit 18 determines the transfer rate again at which the power consumption is minimized within the range of the request from the transmission source apparatus and notifies the transfer apparatus 20 of the newly obtained transfer rate (step S44).

According to the third embodiment, the transmission rate of the target data is adjusted to realize the minimum power consumption within the allowable range of the transfer speed specified by the communication apparatus 1 at the transmission source. For this reason, it is possible to establish the communication where the request of the transmission source is satisfied while the power efficiency in the network is improved.

Fourth Embodiment

According to a fourth embodiment, a description will be given of a case in which the controller 10 adjusts the transfer rate in a case where the communication in a power saving mode is requested from the communication apparatus 1 at the transmission source as described according to the first to third embodiments. The controller 10 in the second embodiment may include those in the controller 10 in the first embodiments.

When a user sets the communication in the power saving mode, the communication apparatus 1 at the transmission source of the target data transmits a control message (power saving notification) illustrated in FIG. 17A to the controller 10. The power saving notification includes the address of the controller 10, the address of the communication apparatus 1 at the transmission source, and a power saving flag. The power saving flag is used to determine whether or not the communication apparatus 1 at the transmission source of the power saving notification is set in the power saving mode. Herein, in the case of the power saving flag=5, the transmission source of the power saving notification is set in the power saving mode. On the other hand, in the case of the power saving flag=6, the transmission source of the power saving notification is not set in the power saving mode. The identification unit 14 of the controller 10 stores a state on whether or not the communication in the power saving mode is requested while being associated with the identifier of the communication apparatus 1 at the transmission source of the power saving notification. For example, the identification unit 14 can store a table illustrated in FIG. 17B.

When the controller 10 receives a communication request, the identification unit 14 determines whether or not the transmission source of the communication request is the communication apparatus 1 requested to perform the communication in the power saving mode. The identification unit 14 requests the power consumption model unit 15 and the traffic information obtaining unit 16 to obtain the information in a case where the transmission source of the communication request is the communication apparatus 1 requested to perform the communication in the power saving mode. For example, in a case where the communication apparatus at the transmission source is UE1, the controller 10 refers to the table of FIG. 17B to request the power consumption model unit 15 and the traffic information obtaining unit 16 to obtain the information. The power consumption model unit 15 and the traffic information obtaining unit 16 operate in response to the request from the identification unit 14 similarly as in the first to third embodiments. The operation by the calculation unit 17 is also similar to hat according to the first to third embodiments. The determination unit 18 enquires the identification unit 14 on the address of the communication apparatus 1 at the transmission source and notifies the transfer rate of the communication apparatus 1 at the transmission source. The communication apparatus 1 at the transmission source transmits the target data to the communication apparatus 1 at the destination after the transmission speed of the target data is set to be matched with the transfer rate.

Figure 18:
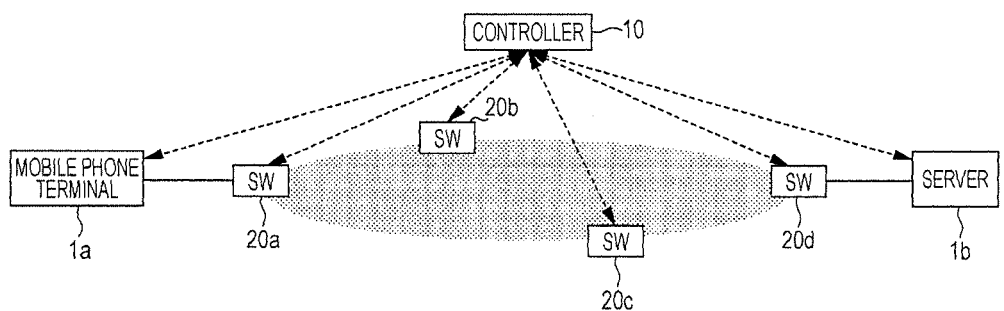
FIG. 18 illustrates a network example to which a fourth embodiment can be applied.

The above-mentioned embodiment is used in a case where the setting on the power saving mode and the adjustment of the transmission speed of the target data can be carried out in the communication apparatus 1 at the transmission source. For example, as illustrated in FIG. 18, when the communication apparatus 1a is a mobile phone terminal and the communication apparatus 1b is a server, the controller 10 can determine the transfer rate of the target data by using the fourth embodiment. In a case where positional information of the mobile phone terminal at the transmission source and information of a base station apparatus at the communication destination of the mobile phone terminal at the transmission source are used, the controller 10 can appropriately obtain those pieces of information from a home memory. When the determination unit 18 notifies the communication apparatus 1a of the transfer rate, the communication apparatus 1a transmits the target data to the communication apparatus 1b after the transmission speed of the target data is set to be matched with the transfer rate.

Others

It is noted that the embodiments are not limited to the above, and various modifications can be made. Some examples of the modifications will be described below.

The controller 10 may hold the power consumption model while being associated with the identifier of the transfer apparatus 20 in advance with regard to the transfer apparatus 20 in the network, for example. The controller 10 may not be provided with the power consumption model unit 15 in this case.

In the above-mentioned example, the description has been given while the communication apparatus 1 is a different apparatus from the transfer apparatus 20, but the controller 10 may be built in the transfer apparatus 20 in the network.

According to any of the embodiments, the controller 10 may notify all the transfer apparatuses 20 included in the route of the transfer rate similarly as in the third embodiment.

In the above, the description has been given as an example in which the power consumption model unit 15 and the traffic information obtaining unit 16 use the topology information table 13 to identify the address of the transfer apparatus 20 in the route. However, the identification unit 14 can notify the power consumption model unit 15 and the traffic information obtaining unit 16 of the address used in the transfer apparatus 20a as the identifier of the transfer apparatus 20a. The identification unit 14 can similarly notify the power consumption model unit 15 and the traffic information obtaining unit 16 of the addresses allocated to the transfer apparatuses 20b and 20d as the respective identifiers.

The case has been described as an example in which the number of route obtained by the identification unit 14 is one, but the number of routes obtained by the identification unit 14 is arbitrary. In a case where plural routes are obtained, the identification unit 14 assigns an identifier to each route and notifies the power consumption model unit 15 and the traffic information obtaining unit 16 of the transfer apparatus 20 included in the route while being associated with the identifier of the route. The calculation unit 17 calculates the power consumption for each route, and the determination unit 18 obtains the transfer rate of the target data so that the power consumption takes a minimum value for each route. The determination unit 18 stores the identifiers of the routes while being associated with the transfer rate of the target data and obtains a case in which the power consumption is minimized among all the routes. For example, it is assumed that the determination unit 18 obtains the following information with regard to a route A, a route B, and a route C.

Minimum value of the power consumption in the route A: $W5$

Transfer rate when the power consumption in the route A is minimized: $x5$

Minimum value of the power consumption in the route B: $W6$

Transfer rate when the power consumption in the route B is minimized: $x6$

Minimum value of the power consumption in the route C: $W7$

Transfer rate when the power consumption in the route C is minimized: $x7$

At this time, if $W5>W6>W7$ is established, the determination unit 18 notifies the identification unit 14 that the route C is used and the transfer rate is set as $x7$. The identification unit 14 then selects the route C as a used route. The identification unit 14 notifies the determination unit 18 of all the transfer apparatuses 20 included in the route C and addresses thereof. The determination unit 18 transmits a transfer request of setting the transfer rate as $x7$ to all the transfer apparatuses 20 notified from the identification unit 14. All the transfer apparatuses 20 that have received the transfer request transfer the target data by using the transfer rate included in the transfer request.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control apparatus comprising:
    a reception unit configured to receive information including information of a transmission source, an amount of target data to be transmitted, and a destination;
    an identification unit configured to identify a transfer apparatus included in a route from the transmission source to the destination;
    a calculation unit configured to:
        obtain from the identified transfer apparatus a power consumption model that provides a transfer rate at which the transfer apparatus performs a data transfer and power consumed by the transfer apparatus during the data transfer, and
calculate a power consumption for transmission of the target data based on the amount of target data applied to the power consumption module;
a determination unit configured to determine a transfer rate for the target data based on the power consumption calculated by the calculation unit; and
a transmission unit configured to transmit a transfer request to the transfer apparatus to adjust settings of the transfer apparatus to transfer the target data at the determined transfer rate.

2. The control apparatus according to claim 1, wherein the determination unit determines the transfer rate corresponding to a power consumption having a relatively low value.

3. The control apparatus according to claim 1, wherein the calculation unit calculates the power consumption as a function of the transfer rate by using:
a time spent for a transfer of the target data, and
power consumed in a case where the transfer apparatus transfers an amount of data corresponding to a sum of a transfer amount per unit time with regard to the data being transferred and a transfer amount per unit time at the transfer rate.

4. The control apparatus according to claim 1, wherein the reception unit further receives an allowable rate range corresponding to a range allowed for the transfer rate of the target data from the transmission source, and
wherein the determination unit causes the transmission unit to transmit the transfer request in a case where the transfer rate is included in the allowable rate range.

5. The control apparatus according to claim 1, wherein the calculation unit obtains a first power consumption model representing a relationship between the power consumption of the identified transfer apparatus and the amount of the target data and a second power consumption model representing a relationship between the power consumption of an additional transfer apparatus and the amount of the target data when it is identified that the identified transfer apparatus and the additional transfer apparatus are included in the route,
wherein the calculation unit calculates a total value of power consumed by the identified first transfer apparatus to transfer the target data in addition to the data being transferred and power consumed by the additional transfer apparatus to transfer the target data in addition to the data being transferred as a function of a bandwidth used for the transfer of the target data, and
wherein the determination unit sets a bandwidth at which the total value has a relatively low value as the transfer rate.

6. The control apparatus according to claim 1, wherein:
the calculation unit is further configured to calculate a minimum power consumption based on the transfer rate at which the transfer apparatus performs the transfer, the power consumed by the transfer apparatus, and the amount of target data,
the determination unit is further configured to determine the transfer rate for the target data based on the minimum power consumption calculated by the calculation unit, and
the transmission unit is further configured to transmit the transfer request to the transfer apparatus to adjust the settings of the transfer apparatus to transfer the target data at the determined transfer rate for the target data based on the minimum power consumption.

7. A control method for a computer to perform processing comprising:
receiving information including information of a transmission source, an amount of target data to be transmitted, and a destination;
identifying a transfer apparatus included in a route from the transmission source to the destination;
obtaining from the identified transfer apparatus a power consumption model that provides a transfer rate at which the transfer apparatus performs a data transfer and power consumed by the transfer apparatus during the data transfer;
calculating a power consumption for transmission of the target data based on the amount of target data applied to the power consumption module;
determining a transfer rate for the target data based on the calculated power consumption; and
transmitting a transfer request to the transfer apparatus to adjust settings of the transfer apparatus to transfer the target data at the determined transfer rate.

8. The control method according to 7, further comprising:
calculating a minimum power consumption based on the transfer rate at which the transfer apparatus performs the transfer, the power consumed by the transfer apparatus, and the amount of target data;
determining the transfer rate for the target data based on the calculated minimum power consumption; and
transmitting the transfer request to the transfer apparatus to adjust the settings of the transfer apparatus to transfer the target data at the determined transfer rate for the target data based on the minimum power consumption.

9. A non-transitory computer-readable storage medium storing a program that causes a computer to execute a procedure, the procedure comprising:
receiving information including information of a transmission source, an amount of target data to be transmitted, and a destination;
identifying a transfer apparatus included in a route from the transmission source to the destination;
obtaining from the identified transfer apparatus a power consumption model that provides a transfer rate at which the transfer apparatus performs a data transfer and power consumed by the transfer apparatus during the data transfer;
calculating a power consumption for transmission of the target data based on the amount of target data applied to the power consumption module;
determining a transfer rate for the target data based on the calculated power consumption; and
transmitting a transfer request to the transfer apparatus to adjust settings of the transfer apparatus to transfer the target data at the determined transfer rate.

10. The non-transitory computer-readable recording medium according to 9, wherein the procedure further comprises:
calculating a minimum power consumption based on the transfer rate at which the transfer apparatus performs the transfer, the power consumed by the transfer apparatus, and the amount of target data;
determining the transfer rate for the target data based on the calculated minimum power consumption; and
transmitting the transfer request to the transfer apparatus to adjust the settings of the transfer apparatus to transfer the target data at the determined transfer rate for the target data based on the minimum power consumption.

* * * * *